Figure 1:
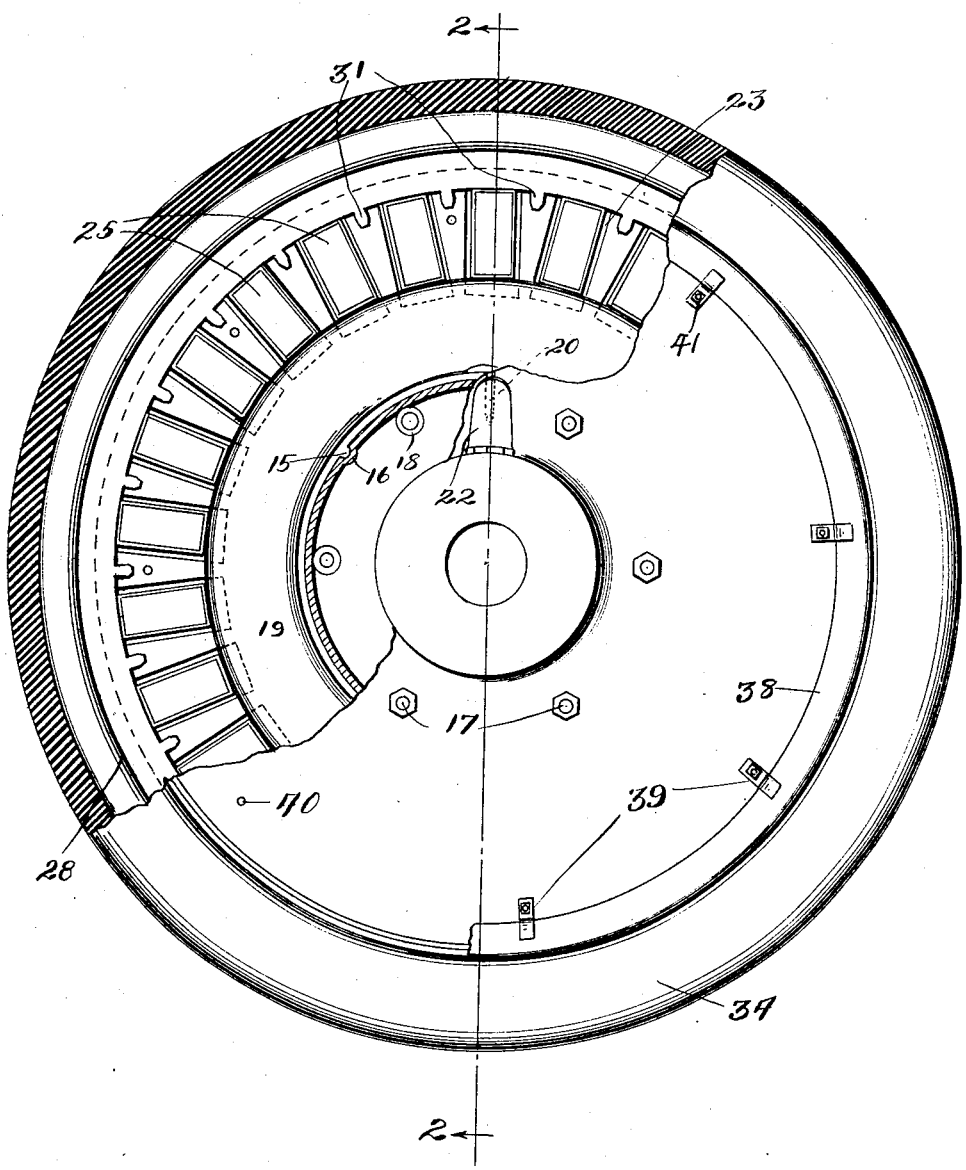

S. J. MARDIS.
VEHICLE WHEEL.
APPLICATION FILED JAN. 3, 1921.

1,389,891.

Patented Sept. 6, 1921.
2 SHEETS—SHEET 1.

Inventor
Samuel J. Mardis
By Harold C. Thome
Attorney

S. J. MARDIS.
VEHICLE WHEEL.
APPLICATION FILED JAN. 3, 1921.
1,389,891.
Patented Sept. 6, 1921.
2 SHEETS—SHEET 2.
Fig. 2.
Fig. 5.
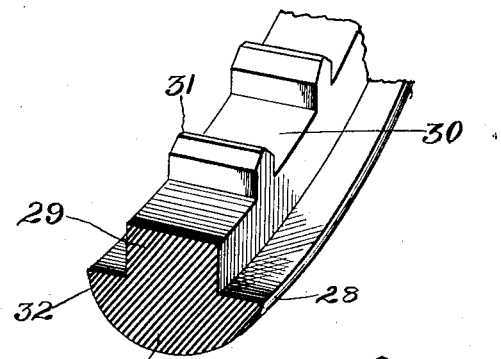
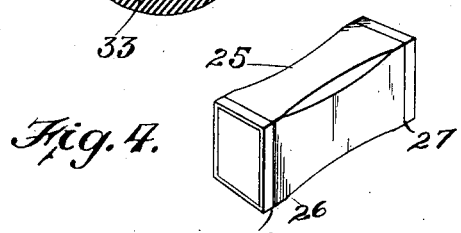
Fig. 4.
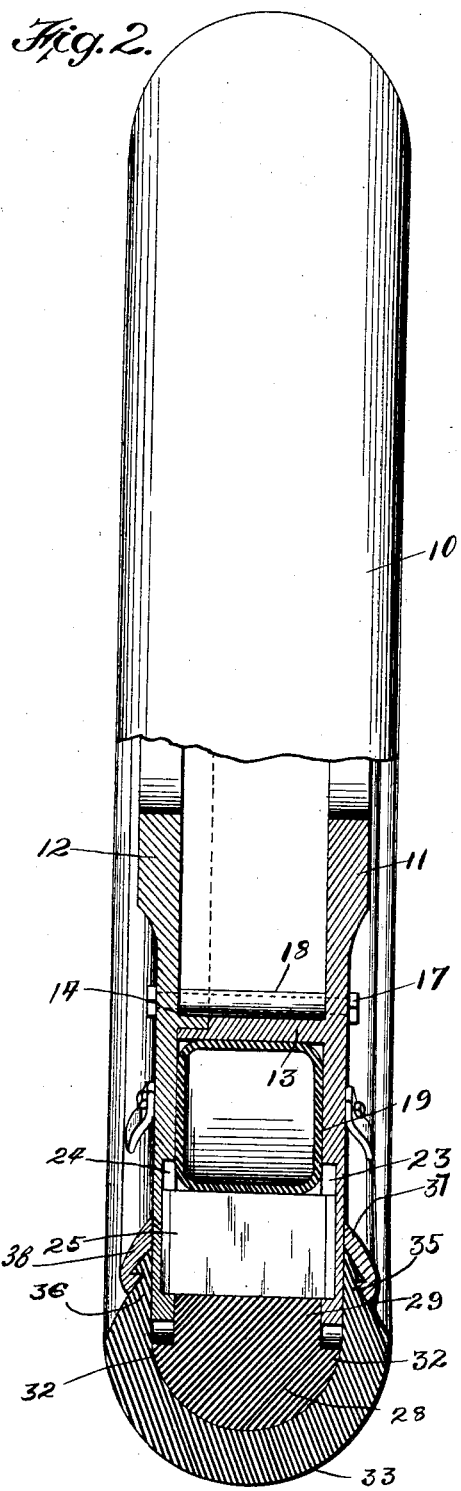
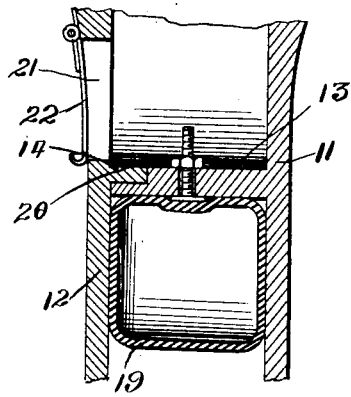
Fig. 3.
Inventor
Samuel J. Mardis
By Harold C. Thome
Attorney

UNITED STATES PATENT OFFICE.

SAMUEL J. MARDIS, OF JOHNSTOWN, PENNSYLVANIA.

VEHICLE-WHEELS.

1,389,891. Specification of Letters Patent. Patented Sept. 6, 1921.

Application filed January 3, 1921. Serial No. 434,755.

*To all whom it may concern:*

Be it known that I, SAMUEL J. MARDIS, a citizen of the United States, residing at Johnstown, in the county of Cambria and State of Pennsylvania, have invented certain new and useful Improvements in Vehicle-Wheels, of which the following is a specification.

This invention relates to improvements in vehicle wheels having inner pneumatic cushions, and consists in a pair of spaced disk members adapted to be mounted on a central hub member, and supporting between them an inner pneumatic cushion member which coöperates with a series of radial thrust members mounted in guide ways in the disk members to support a tire which extends beyond the outer periphery of the disks and over their edges.

A further feature of the invention is the provision of a casing shoe which is adapted to extend over the tire and engage the sides of the disk members.

Further features and details of the invention will appear as described in connection with the accompanying drawings and hereinafter set forth and claimed.

Referring to the drawings forming a part of this specification, and in which similar characters of reference on the different figures thereof indicate corresponding elements or features of construction:

Figure 1 is a side elevation of a wheel constructed in accordance with my invention, with portions broken away to show the interior arrangement of parts, Fig. 2 is a sectional view taken on line 2—2 of Fig. 1, partly in elevation, and Figs. 3 to 5 inclusive are detail views.

Referring to the drawings, the wheel is generally designated by a reference numeral 10, and comprises a pair of disk members, 11 and 12, adapted to be fastened to a central hub member (not shown). The inner disk member 11 is provided with a concentric flange 13, and the outer disk 12 has a flange 14, which coöperates with the flange 13 for properly spacing the disks, and by means of one or more radial projections 15 on one of the flanges coöperating with grooves 16 in the other the disks are prevented from turning with respect to each other. The disks are fastened together by means of bolts, such as 17, and they may be provided with spacing sleeves or tubes 18 positioned over them.

A pneumatic tube or cushion 19 comprising a rubber or fabric and rubber composition casing is positioned between the disks surrounding the flange 13. This tube is provided with a valve stem 20 which extends radially inward through an aperture in the flange 13, and is accessible through an aperture 21 in the disk 12, normally closed by a spring door 22. (See Fig. 3.)

Each disk, 11 and 12, is provided with a series of radial slots 23, 24, in closely spaced relation with each other, slots in one disk being arranged in the same angular relationship as the slots in the other, thereby forming guides for the ends of thrust members 25 surrounding the cushion member 19. As shown in Fig. 4, each thrust member, 25, comprises a wooden rectangular block, 26, grooved at its ends for receiving metallic bands 27. These blocks slide freely in the radial slots 23—24 and transmit pressure on a tire member 28 to the cushion 19.

A section of the tire member 28 is shown in Fig. 5; it is made of rubber or other resilient composition and is of such a width at 29 as to fit between the disk members. The inner surface 30 of the tire is provided with a series of projections 31 which are adapted to extend between adjacent thrust blocks 25 for preventing the tire from turning with respect to the wheel. Circumferential flanges 32 extend over the edges of disks 11 and 12 from the portion 33, which projects beyond the disk members.

A casing 34 is shown mounted over the tire member 28 and has side portions 35 and 36 engaging the disks 11 and 12. Clencher rings 37 and 38 engage the sides 35 and 36 of the casing and are maintained in place by clamps 39 mounted on bolts 40. These bolts may be fastened in the disk 11 and provided with spacing elements for the disks, such as sleeves provided for bolts 17, and nuts 41 are adapted to hold the clamps 39 in proper position.

It will be noted that in a wheel constructed as disclosed, the inclosure formed by the disk members 11 and 12 and casing 34 will prevent foreign matter from entering and getting to the inner cushion or otherwise damaging the operating parts. Further by means of a number of small blocks closely spaced around the cushion member for transmitting the thrust from the tire, a smooth operation of the various elements is obtained.

It will readily be seen that in assembling the wheel that the cushion member is positioned over the supporting flanges, and after the other parts have been put in place and the disks assembled, it is inflated until the proper tension of the parts is obtained.

Having shown and described one embodiment of my invention, I do not desire to have it confined closely to the specific structure disclosed, it being understood that changes may be made in form, proportion, and organization of its various parts without departing from the spirit of the invention as indicated by the scope of the appended claims.

What I claim as my invention, and desire to secure by Letters Patent is:

1. A vehicle wheel including a pair of disk members, each provided with an annular flange member, which flanges are adapted to telescope with each other for spacing the disks and providing a supporting member, resilient means mounted on said supporting member, thrust members arranged between said disks and beyond said resilient means, and a tire member mounted on said thrust members and extending beyond the periphery of said disks.

2. A vehicle wheel including a pair of disk members, annular flanges on said members coöperating with each other for maintaining said members in spaced relation and forming a support, a pneumatic tube supported by said flanges, a series of thrust members arranged radially between said disks and beyond said tube, a tire member positioned between the disks so as to engage said thrust members and extending beyond the periphery of the disks, and a casing shoe positioned over said tire member and engaging the sides of the disks.

3. A vehicle wheel including a pair of disk members, an annular supporting member included between said disk members, a cushion surrounding said supporting member, a series of thrust members arranged radially between said disks and beyond said cushion, a tire member positioned between the disks so as to engage said thrust members and extending beyond the sides of the disks, projections on the tire extending between the thrust members and a casing shoe positioned over said tire member and engaging the sides of the disks.

4. A vehicle wheel including a pair of disk members, a tire member positioned between said members and extending over the peripheral edges thereof, a casing shoe for covering said tire member and extending against the outer sides of the disks, clencher rings engaging the portions of said casing against the sides of the disks, and clamping means for said rings.

In testimony whereof I affix my signature.

SAMUEL J. MARDIS.